(12) United States Patent
Sujan et al.

(10) Patent No.: US 8,742,701 B2
(45) Date of Patent: Jun. 3, 2014

(54) SYSTEM, METHOD, AND APPARATUS FOR INTEGRATED HYBRID POWER SYSTEM THERMAL MANAGEMENT

(75) Inventors: Vivek Anand Sujan, Columbus, IN (US); Nazar Al-Khayat, Larbert (GB); Bangalore Siddalingappa Nagabhushana, Bangalore (IN)

(73) Assignee: Cummins Inc., Columbus, IN (US)

( * ) Notice: Subject to any disclaimer, the term of this patent is extended or adjusted under 35 U.S.C. 154(b) by 629 days.

(21) Appl. No.: 12/972,627

(22) Filed: Dec. 20, 2010

(65) Prior Publication Data

US 2012/0152186 A1 Jun. 21, 2012

(51) Int. Cl.
*H02K 7/14* (2006.01)
*F01P 7/14* (2006.01)
*F01P 1/06* (2006.01)
*B60W 20/00* (2006.01)

(52) U.S. Cl.
USPC ....... 318/3; 123/41.09; 123/41.31; 180/65.29

(58) Field of Classification Search
USPC .............. 318/3; 123/41.09, 41.31; 180/65.29
See application file for complete search history.

(56) References Cited

U.S. PATENT DOCUMENTS

| | | | |
|---|---|---|---|
| 3,566,717 A | 3/1971 | Berman et al. |
| 3,732,751 A | 5/1973 | Berman et al. |
| 3,923,115 A | 12/1975 | Helling |
| 4,021,677 A | 5/1977 | Rosen et al. |
| 4,099,589 A | 7/1978 | Williams |
| 4,165,795 A | 8/1979 | Lynch et al. |
| 4,233,858 A | 11/1980 | Rowlett |
| 4,305,254 A | 12/1981 | Kawakatsu et al. |
| 4,335,429 A | 6/1982 | Kawakatsu |
| 4,405,029 A | 9/1983 | Hunt |
| 4,407,132 A | 10/1983 | Kawakatsu et al. |
| 4,428,190 A | 1/1984 | Bronicki |
| 4,438,342 A | 3/1984 | Kenyon |
| 4,489,242 A | 12/1984 | Worst |

(Continued)

FOREIGN PATENT DOCUMENTS

| | | |
|---|---|---|
| WO | 2006135871 A2 | 12/2006 |
| WO | 2010116104 A1 | 10/2010 |

OTHER PUBLICATIONS

International Search Report and Written Opinion, ISA/US, PCT/US2011/056901, Cummins Inc., Mar. 4, 2012.

(Continued)

*Primary Examiner* — Eduardo Colon Santana
*Assistant Examiner* — Gabriel Agared
(74) *Attorney, Agent, or Firm* — Krieg DeVault LLP

(57) ABSTRACT

A system includes an engine and a first coolant thermally coupled to the engine and circulated by a first pump; a hybrid battery pack thermally coupled to a second coolant circulated by a second pump; and an electric component thermally coupled to the second coolant. The system includes a first heat exchanger that transfers thermal energy between the first coolant and the second coolant. The system includes a second heat exchanger that transfers thermal energy between the second coolant and the auxiliary fluid stream having a temperature below a target operating temperature for the hybrid battery pack. The system includes a first bypass for the first or second coolant at the first heat exchanger, a second bypass for the second coolant or the auxiliary fluid stream at the second heat exchanger, and a component bypass for the second coolant at the hybrid battery pack or the electric component.

28 Claims, 3 Drawing Sheets

(56) References Cited

U.S. PATENT DOCUMENTS

| | | | |
|---|---|---|---|
| 4,588,040 A | 5/1986 | Albright, Jr. et al. |
| 5,251,588 A | 10/1993 | Tsujii et al. |
| 5,255,733 A | 10/1993 | King |
| 5,323,868 A | 6/1994 | Kawashima |
| 5,327,991 A | 7/1994 | Yoshida |
| 5,327,992 A | 7/1994 | Boll |
| 5,358,317 A | 10/1994 | Cikanek |
| 5,403,244 A | 4/1995 | Tankersley et al. |
| 5,428,274 A | 6/1995 | Furutani et al. |
| 5,433,282 A | 7/1995 | Moroto et al. |
| 5,437,157 A | 8/1995 | Bronicki |
| 5,492,189 A | 2/1996 | Kriegler et al. |
| 5,513,719 A | 5/1996 | Moroto et al. |
| 5,531,285 A | 7/1996 | Green |
| 5,558,173 A | 9/1996 | Sherman |
| 5,558,595 A | 9/1996 | Schmidt et al. |
| 5,562,565 A | 10/1996 | Moroto et al. |
| 5,635,805 A | 6/1997 | Ibaraki et al. |
| 5,643,119 A | 7/1997 | Yamaguchi et al. |
| 5,650,931 A | 7/1997 | Nii |
| 5,678,760 A | 10/1997 | Muso et al. |
| 5,713,425 A | 2/1998 | Buschhaus et al. |
| 5,722,502 A | 3/1998 | Kubo |
| 5,755,303 A | 5/1998 | Yamamoto et al. |
| 5,762,156 A | 6/1998 | Bates et al. |
| 5,775,449 A | 7/1998 | Moroto et al. |
| 5,778,326 A | 7/1998 | Moroto et al. |
| 5,788,006 A | 8/1998 | Yamaguchi |
| 5,789,881 A | 8/1998 | Egami et al. |
| 5,818,116 A | 10/1998 | Nakae et al. |
| 5,820,172 A | 10/1998 | Brigham et al. |
| 5,832,396 A | 11/1998 | Moroto et al. |
| 5,842,534 A | 12/1998 | Frank |
| 5,842,535 A | 12/1998 | Dennis |
| 5,845,731 A | 12/1998 | Buglione et al. |
| 5,846,155 A | 12/1998 | Taniguchi et al. |
| 5,862,346 A | 1/1999 | Kley et al. |
| 5,864,771 A | 1/1999 | Yokoyama et al. |
| 5,865,263 A | 2/1999 | Yamaguchi et al. |
| 5,871,859 A | 2/1999 | Parise |
| 5,892,346 A | 4/1999 | Moroto et al. |
| 5,908,077 A | 6/1999 | Moore |
| 5,923,093 A | 7/1999 | Tabata et al. |
| 5,924,406 A | 7/1999 | Kinugasa et al. |
| 5,934,396 A | 8/1999 | Kurita |
| 5,971,092 A | 10/1999 | Walker |
| 6,009,365 A | 12/1999 | Takahara et al. |
| 6,019,699 A | 2/2000 | Hoshiya et al. |
| 6,026,921 A | 2/2000 | Aoyama et al. |
| 6,032,753 A | 3/2000 | Yamazaki et al. |
| 6,032,869 A | 3/2000 | Ito et al. |
| 6,057,050 A | 5/2000 | Parise |
| 6,070,650 A | 6/2000 | Inoue et al. |
| 6,223,842 B1 | 5/2001 | Masaki |
| 6,223,846 B1 | 5/2001 | Schechter |
| 6,251,042 B1 | 6/2001 | Peterson et al. |
| 6,300,858 B1 | 10/2001 | Kalapodis et al. |
| 6,334,079 B1 | 12/2001 | Matsubara et al. |
| 6,367,570 B1 | 4/2002 | Long, III et al. |
| 6,374,780 B1 | 4/2002 | Rutyna et al. |
| 6,389,807 B1 | 5/2002 | Suzuki et al. |
| 6,404,636 B1 | 6/2002 | Staggers et al. |
| 6,421,599 B1 | 7/2002 | Lippa et al. |
| 6,427,793 B1 | 8/2002 | Hanada et al. |
| 6,434,928 B1 | 8/2002 | Manaka |
| 6,452,286 B1 | 9/2002 | Kubo et al. |
| 6,464,028 B1 | 10/2002 | Imani |
| 6,467,557 B2 | 10/2002 | Hasebe et al. |
| 6,470,985 B1 | 10/2002 | Inada et al. |
| 6,487,477 B1 | 11/2002 | Woestman et al. |
| 6,501,190 B1 | 12/2002 | Seguchi et al. |
| 6,515,872 B2 | 2/2003 | Nakayama et al. |
| 6,533,031 B1 | 3/2003 | Garcia et al. |
| 6,568,173 B1 | 5/2003 | Kolmanovsky et al. |
| 6,570,749 B1 | 5/2003 | Ling et al. |
| 6,573,687 B2 | 6/2003 | Kimura et al. |
| 6,598,496 B2 | 7/2003 | Pannell |
| 6,616,059 B2 | 9/2003 | Sabhapathy et al. |
| 6,629,026 B1 | 9/2003 | Baraszu |
| 6,647,961 B2 | 11/2003 | Suzuki et al. |
| 6,653,002 B1 | 11/2003 | Parise |
| 6,668,953 B1 | 12/2003 | Reik et al. |
| 6,725,679 B2 | 4/2004 | Itoh et al. |
| 6,807,931 B2 | 10/2004 | Taylor et al. |
| 6,809,429 B1 | 10/2004 | Frank |
| 6,863,139 B2 | 3/2005 | Egami et al. |
| 6,887,180 B2 | 5/2005 | Pels et al. |
| 6,901,751 B2 | 6/2005 | Bunting et al. |
| 6,910,329 B2 | 6/2005 | Bunting et al. |
| 6,912,848 B2 | 7/2005 | Bedapudi |
| 6,915,629 B2 | 7/2005 | Szymkowicz |
| 6,928,807 B2 | 8/2005 | Jacob et al. |
| 6,942,728 B2 | 9/2005 | Caillat et al. |
| 6,959,241 B2 | 10/2005 | Itow et al. |
| 6,986,251 B2 | 1/2006 | Radcliff et al. |
| 7,007,464 B2 | 3/2006 | Asami et al. |
| 7,024,858 B2 | 4/2006 | Gray Jr. |
| 7,028,793 B2 | 4/2006 | Hu et al. |
| 7,040,434 B2 | 5/2006 | Komiyama et al. |
| 7,082,905 B2 | 8/2006 | Fukuda et al. |
| 7,100,362 B2 | 9/2006 | McGee et al. |
| 7,100,369 B2 | 9/2006 | Yamaguchi et al. |
| 7,104,347 B2 | 9/2006 | Severinsky et al. |
| 7,104,920 B2 | 9/2006 | Beaty et al. |
| 7,114,585 B2 | 10/2006 | Man et al. |
| 7,119,454 B1 | 10/2006 | Chiao |
| 7,150,938 B2 | 12/2006 | Munshi et al. |
| 7,188,020 B2 | 3/2007 | Yasui et al. |
| 7,200,476 B2 | 4/2007 | Cathorne et al. |
| 7,213,397 B2 | 5/2007 | Hu et al. |
| 7,234,552 B2 | 6/2007 | Prema et al. |
| 7,276,815 B2 | 10/2007 | Algrain et al. |
| 7,284,594 B2 | 10/2007 | Sanada et al. |
| 7,287,506 B1 | 10/2007 | Reiners et al. |
| 7,303,504 B2 | 12/2007 | Uchisasai et al. |
| 7,340,897 B2 | 3/2008 | Zimron et al. |
| 7,360,615 B2 | 4/2008 | Salman et al. |
| 7,370,612 B2 | 5/2008 | Hanai |
| 7,377,237 B2 | 5/2008 | Carney et al. |
| 7,380,586 B2 | 6/2008 | Gawthrop |
| 7,391,129 B2 | 6/2008 | Chiao et al. |
| 7,392,871 B2 | 7/2008 | Severinsky et al. |
| 7,411,312 B2 | 8/2008 | Chiao |
| 7,448,458 B2 | 11/2008 | Meyer |
| 7,455,134 B2 | 11/2008 | Severinsky et al. |
| 7,487,030 B2 | 2/2009 | Heap et al. |
| 7,492,055 B2 | 2/2009 | Chiao |
| 7,520,351 B2 | 4/2009 | Uchisasai et al. |
| 7,520,353 B2 | 4/2009 | Severinsky et al. |
| 7,559,388 B2 | 7/2009 | Severinsky et al. |
| 7,568,539 B2 | 8/2009 | Abe et al. |
| 7,572,201 B2 | 8/2009 | Supina et al. |
| 7,577,507 B2 | 8/2009 | Morris |
| 7,578,363 B2 | 8/2009 | Kim |
| 7,582,034 B2 | 9/2009 | Usoro |
| 7,582,980 B2 | 9/2009 | Motoike et al. |
| 7,597,164 B2 | 10/2009 | Severinsky et al. |
| 7,621,120 B2 | 11/2009 | Matheaus et al. |
| 7,633,247 B2 | 12/2009 | Obayashi |
| 7,726,130 B2 | 6/2010 | McDowell |
| 7,739,994 B2 | 6/2010 | Megilvray et al. |
| 7,748,214 B2 | 7/2010 | Ishii et al. |
| 7,793,492 B2 | 9/2010 | Abraham et al. |
| 7,832,194 B2 | 11/2010 | Ichimoto et al. |
| 2002/0007636 A1* | 1/2002 | Hay ............................ 60/618 |
| 2003/0116368 A1 | 6/2003 | Winkelman et al. |
| 2004/0045749 A1* | 3/2004 | Jaura et al. ................. 180/65.2 |
| 2004/0074682 A1 | 4/2004 | Fussey et al. |
| 2006/0101809 A1 | 5/2006 | Bodo et al. |
| 2007/0001632 A1* | 1/2007 | Daio ........................... 318/254 |
| 2007/0112475 A1 | 5/2007 | Koebler et al. |
| 2007/0130922 A1 | 6/2007 | Dye et al. |
| 2007/0175230 A1* | 8/2007 | Plummer et al. ............. 62/236 |
| 2007/0225888 A1 | 9/2007 | Morris |

(56) References Cited

U.S. PATENT DOCUMENTS

| | | |
|---|---|---|
| 2007/0245737 A1 | 10/2007 | Inaba et al. |
| 2007/0289291 A1 | 12/2007 | Rabinovich et al. |
| 2008/0039263 A1 | 2/2008 | Usoro |
| 2008/0051242 A1 | 2/2008 | Usoro |
| 2008/0060589 A1 | 3/2008 | Carney et al. |
| 2008/0099256 A1 | 5/2008 | Holmes et al. |
| 2008/0103679 A1 | 5/2008 | Ruiz |
| 2008/0224478 A1 | 9/2008 | Tamor |
| 2008/0242498 A1 | 10/2008 | Miller et al. |
| 2008/0251303 A1 | 10/2008 | Rouaud et al. |
| 2008/0257311 A1 | 10/2008 | Spicer et al. |
| 2008/0300743 A1 | 12/2008 | Conlon et al. |
| 2009/0115491 A1 | 5/2009 | Anwar et al. |
| 2009/0118090 A1 | 5/2009 | Heap et al. |
| 2009/0118969 A1 | 5/2009 | Heap et al. |
| 2009/0188450 A1 | 7/2009 | Kline et al. |
| 2009/0195093 A1 | 8/2009 | Bandai et al. |
| 2009/0195203 A1 | 8/2009 | Yurgil |
| 2009/0197727 A1 | 8/2009 | Janson |
| 2009/0197728 A1 | 8/2009 | Janson |
| 2009/0198429 A1 | 8/2009 | Farrel et al. |
| 2009/0199553 A1 | 8/2009 | Nishimura et al. |
| 2009/0200094 A1 | 8/2009 | Zohrer et al. |
| 2009/0200095 A1 | 8/2009 | Kawasaki |
| 2009/0205588 A1 | 8/2009 | Bilezikjian et al. |
| 2009/0205886 A1 | 8/2009 | Supina et al. |
| 2009/0209146 A1 | 8/2009 | Jegel |
| 2009/0209381 A1 | 8/2009 | Ai et al. |
| 2009/0221390 A1 | 9/2009 | Houle |
| 2009/0223727 A1 | 9/2009 | Tolksdorf |
| 2009/0324453 A1 | 12/2009 | Harinath et al. |
| 2010/0012054 A1* | 1/2010 | Justin et al. .................. 123/41.1 |
| 2010/0043414 A1 | 2/2010 | Hirose |
| 2010/0126692 A1* | 5/2010 | Min et al. ......................... 165/41 |
| 2010/0164235 A1* | 7/2010 | Woods et al. .................. 290/1 R |
| 2012/0132394 A1 | 5/2012 | Oberti et al. |

OTHER PUBLICATIONS

International Search Report and Written Opinion, ISA/US, PCT/US2011/066146, Cummins Inc., Mar. 29, 2012.

Ashley, Steven, SMA-based 'energy-scavenging device' could convert exhaust heat into useful power, SAE International, Mar. 2, 2010, http://www.sae.org/mags/aei/7461.

* cited by examiner

SYSTEM, METHOD, AND APPARATUS FOR INTEGRATED HYBRID POWER SYSTEM THERMAL MANAGEMENT

BACKGROUND

The present application relates to managing temperatures in hybrid power systems, and more particularly but not exclusively relates to managing temperatures for hybrid power systems having variable temperature requirements for a number of devices. Hybrid power systems include multiple power devices, for example an internal combustion engine and a battery pack. The multiple power devices have variable duty cycles and warm-up times, as well as variable optimal temperatures and variable compatible temperature ranges. Presently available have a number of drawbacks. Devices that utilize the same cooling fluid for an engine and electrical components are capable of only sub-optimal temperature control for some devices, are subject to restrictions in component order within the cooling system, and are not robust to fluctuations in the temperature of the cooling fluid. Systems that can only provide auxiliary cooling for devices cannot promote quick warm-up or holding temperatures for devices within a relatively narrow operating temperature band. Accordingly, there is a demand for further improvements in this area of technology.

SUMMARY

One embodiment is a unique method for integrated thermal management of components of a hybrid power system. The method includes selectively increasing a heat transfer rate between a second coolant, and each of a first heat exchanger and a second heat exchanger. The first heat exchanger thermally couples a first coolant with the second coolant, and the second heat exchanger thermally couples an auxiliary fluid stream with the second coolant. The second coolant is circulated past one or more electric components of the hybrid power system. Further embodiments, forms, objects, features, advantages, aspects, and benefits shall become apparent from the following description and drawings.

DESCRIPTION OF THE ILLUSTRATIVE EMBODIMENTS

Figure 1:
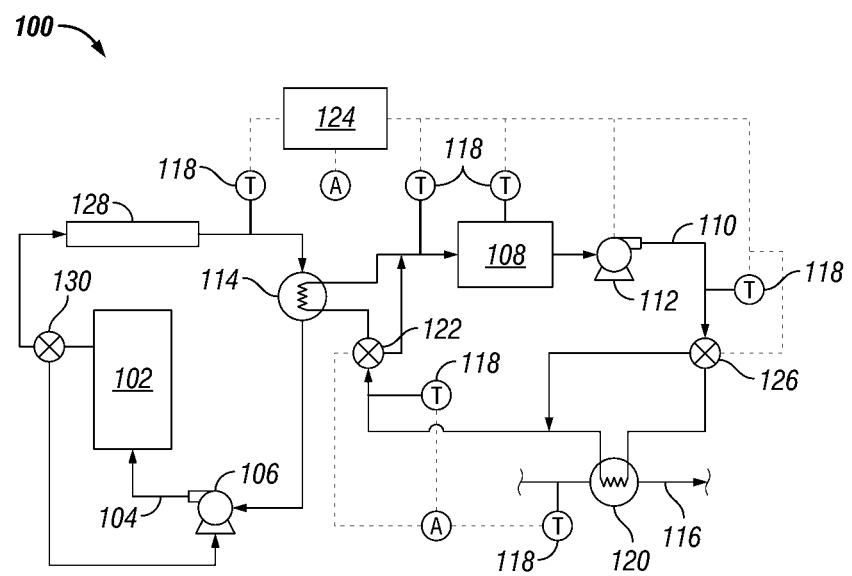
FIG. 1 is a schematic diagram of a system for integrated hybrid power system thermal management of components.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein as would normally occur to one skilled in the art to which the invention relates are contemplated and protected.

FIG. 1 is a schematic diagram of a system for integrated hybrid power system thermal management of components. The system 100 includes an internal combustion engine 102 and a first coolant 104 thermally coupled to the internal combustion engine 102 and circulated by a first pump 106. The first coolant 104 in the exemplary system 100 is an engine coolant 104, and is circulated as generally understood in the art, including a thermostat 130 that prevents engine coolant from circulating through a radiator 128 until the engine reaches a predetermined operating temperature.

The system 100 further includes an electric component 108 and a second coolant 110 thermally coupled to the electric component 108 and circulated by a second pump 112. The system 100 further includes a first heat exchanger 114 that transfers thermal energy between the first coolant 104 and the second coolant 110. The system 100 includes the heat exchanger 114 positioned downstream of the radiator 128 in the engine coolant 104 circulation loop. In certain embodiments, the heat exchanger 114 may be upstream of the radiator 128, on a bypass line (not shown) around the radiator 128, or selectably accepting fluid from the radiator 128 or a bypass line around the radiator 128. Additionally, the heat exchanger 114 may be upstream of the thermostat 130, whereupon engine coolant 104 circulates through the heat exchanger 114 even before the thermostat 130 opens. The selection of a position for the first heat exchanger 114 within the engine coolant 104 loop is a mechanical step for one of skill in the art having the benefit of the disclosures herein.

The engine coolant 104 provides either heating or cooling to the second coolant 110 through the heat exchanger 114. Heating is desirable when the temperature of the electric component 108 is below a target operating temperature, and is available when a temperature of the engine coolant 104 is higher than a temperature of the second coolant 110. For example, after a cold start event of the system 100, it may be desirable to heat a battery pack 108 quickly into an efficient operating temperature. The engine coolant 104 heats quickly from the operations of the engine 102, and heat exchange through the heat exchanger 114 is used to rapidly warm up the battery pack 108. Cooling is desirable when the temperature of the electric component 108 is higher than a target operating temperature, and is available when a temperature of the engine coolant 104 is lower than a temperature of the second coolant 110.

The exemplary system 100 further includes an auxiliary fluid stream 116 having a temperature below a target operating temperature for the electric component 108. The auxiliary fluid stream 116 may have a temperature below the target operating temperature for the electric component 108 only intermittently, and/or only during certain operating conditions of the system 100. Exemplary auxiliary fluid streams 116 include a condenser liquid stream (e.g. condensed refrigerant from an air conditioning system for a vehicle), an evaporator vapor stream, and/or an ambient air stream. The system 100 includes a second heat exchanger 120 that transfers thermal energy between the second coolant 110 and the auxiliary fluid stream 116. Where more than one auxiliary fluid stream 116 is present, the second heat exchanger 120 may be structured to accept selectable fluids on the auxiliary fluid stream side, and/or the second heat exchanger 120 may include more than one thermal contact device, where the selected auxiliary fluid stream is determined by which of the thermal contact devices of the second heat exchanger 120 is presently active. The exemplary system 100 further includes the electric component 108 as a battery pack of a hybrid power system, although the electric component 108 may be any electric component known in the art, including at least a battery pack, motor, generator, motor-generator, and/or power electronics. Power electronics, as used herein, include any components included to configure electrical output (e.g. inverters, rectifiers, etc.) or to support any of the other electric components in the system 100.

In certain embodiments, the system 100 includes a first bypass valve 122 that bypasses a selectable portion of the first coolant 104 or the second coolant 110 around the first heat exchanger 114. The first bypass valve 122 thereby controls an amount of heat transfer that occurs in the first heat exchanger 114. One of skill in the art will recognize that bypassing either an amount of the first coolant 104 or the second coolant 110 around the first heat exchanger 114 will reduce the amount of heat transfer in the first heat exchanger 114. The bypass valve 122 is any type of valve understood in the art, and may be a fully capable three-way valve, i.e. having the ability to provide full flow to the first heat exchanger 114, full flow to the bypass line, or any value in between. The first bypass valve 122 may alternatively only open the flow to the bypass line, or may have a discrete number of positions (e.g. OPEN and CLOSED) rather than be continuously variable.

In certain embodiments, the system 100 includes a second bypass valve 126 that bypasses a selectable portion of the second coolant 110 or the auxiliary fluid stream 116 around the second heat exchanger 120. The second bypass valve 126 is illustrated to bypass the second coolant 110, but may instead bypass a selectable portion of the auxiliary fluid stream 116. As with the first bypass valve 122, the second bypass valve 126 may be of any type and capability known in the art.

The exemplary system 100 further includes a controller 124 that is a portion of a processing subsystem that performs certain operations for thermal management of the integrated hybrid power system. The controller 124 may be in communication with any sensor, actuator, or electronic device in the system 100. The controller 124 may be organized in modules, the modules structured to functionally execute operations for thermal management in the system 100. The exemplary controller 124 includes an operating conditions module, a first heat exchanger module, a second heat exchanger module, and/or a bypass calculation module. Detailed operations for an exemplary controller 124 are described in section referencing FIG. 3.

The system 100 includes one or more temperature sensors 118 that determine temperature values that are made available to the controller 124. The illustrated temperature sensors 118 are exemplary and non-limiting, and one or more temperature sensors 118 illustrated on FIG. 1 may not be present in certain embodiments. Any temperature provided in the system 100 may be determined by a sensor 118, by another device and reported to the controller 124 through software, a network, or a datalink, and/or a specific temperature may be calculated or estimated from other parameters available in the system 100.

Figure 2:
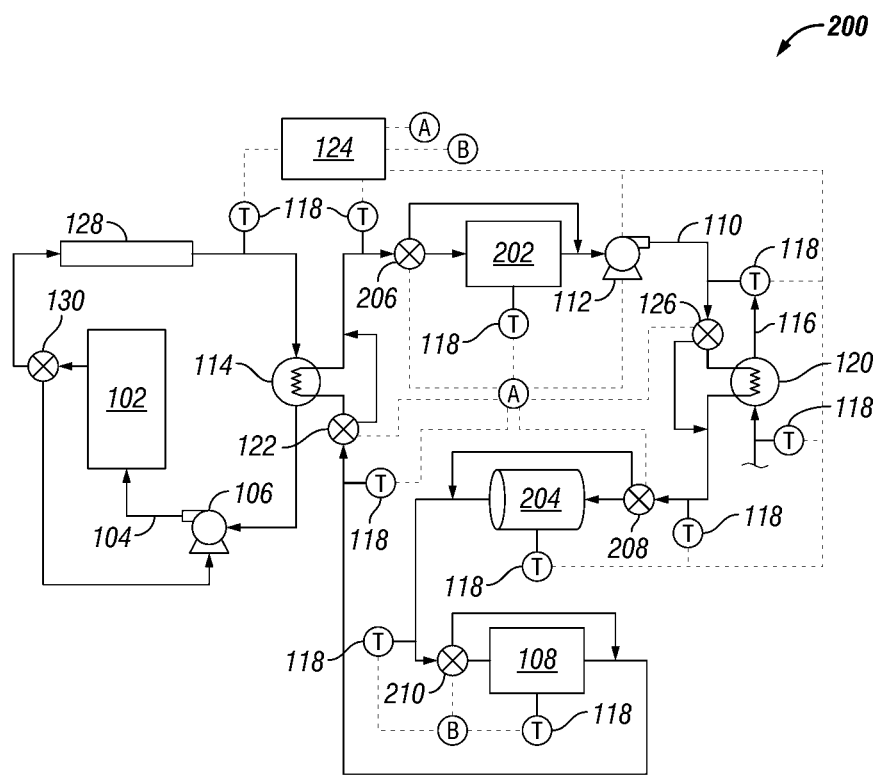
FIG. 2 is a schematic diagram of an alternate system for integrated hybrid power system thermal management of components.

FIG. 2 is a schematic diagram of an alternate system 200 for integrated hybrid power system thermal management of components. The system 200 includes additional electric components, including a second electric component 202 and a third electric component 204. In the example of FIG. 2, the second electric component 202 is a power electronics component, and the third electric component 204 is a motor-generator. Each electric component 108, 202, 204 is thermally coupled to the circulating second coolant 110. The system 200 further includes electric component bypass valves 206, 208, 210, each valve selectively bypassing a portion of the second coolant 110 around one of the electric components 108, 202, 204. The system 200 includes any number of bypass valves 206, 208, 210, from zero valves to a valve for each of the electric components 108, 202, 204.

The system 200 includes the first heat exchanger 114 and second heat exchanger 120, each heat exchanger having a bypass valve 122, 126. The components 108, 202, 204 may be positioned in any order throughout the flow path of the second coolant 110, and further the heat exchangers 114, 120 may be positioned anywhere in the flow path of the second coolant 110.

The heat exchanger 114 with the engine coolant 104 can provide heating or cooling to the second coolant 110 depending upon the specific operating conditions present in the system 200. The heat exchanger 120, where the auxiliary fluid stream 116 is a condenser liquid or evaporator vapor stream, provides high cooling capability. Accordingly, devices may be configured in a convenient thermal arrangement—e.g. where a device that benefits from a rapid warmup is positioned immediately downstream of the first heat exchanger 114 and another device that benefits from highly capable cooling is positioned immediately downstream of the second heat exchanger 120. However, the convenient thermal arrangement may not be available due to the size and position of various electric components 108, 202, 204 in relation to other portions of the system 200 such as the transmission, engine starter, etc. (not shown). The use of one or more bypass valves 206, 208, 210 allows the system 200 to have any arrangement of electric components 108, 202, 204 and still achieve acceptable thermal management of the components 108, 202, 204, including having a component with a higher temperature target positioned upstream of a device with a lower temperature target.

An exemplary embodiment includes the second coolant 110 flowing through, in order, the first heat exchanger 114, an additional electric component (e.g. the power inverter 202), and the hybrid battery pack 108, where the target operating temperature for the hybrid battery pack 108 is lower than a second target operating temperature for the additional electric component 202. A further embodiment includes the second heat exchanger 120 positioned between the additional electric component 202 and the hybrid battery pack 108. A still further embodiment includes a third electric component (e.g. the motor-generator 204), where the second coolant 110 is thermally coupled to the third electric component 204, and where the third electric component 204 is positioned between the second heat exchanger 120 and the hybrid battery pack 108. The described example includes a third target operating temperature for the third electric component 204 that is lower than the second target operating temperature. In a still further embodiment, the target operating temperature for the hybrid battery pack 108 is lower than the third target operating temperature for the third electric component 204.

Figure 3:
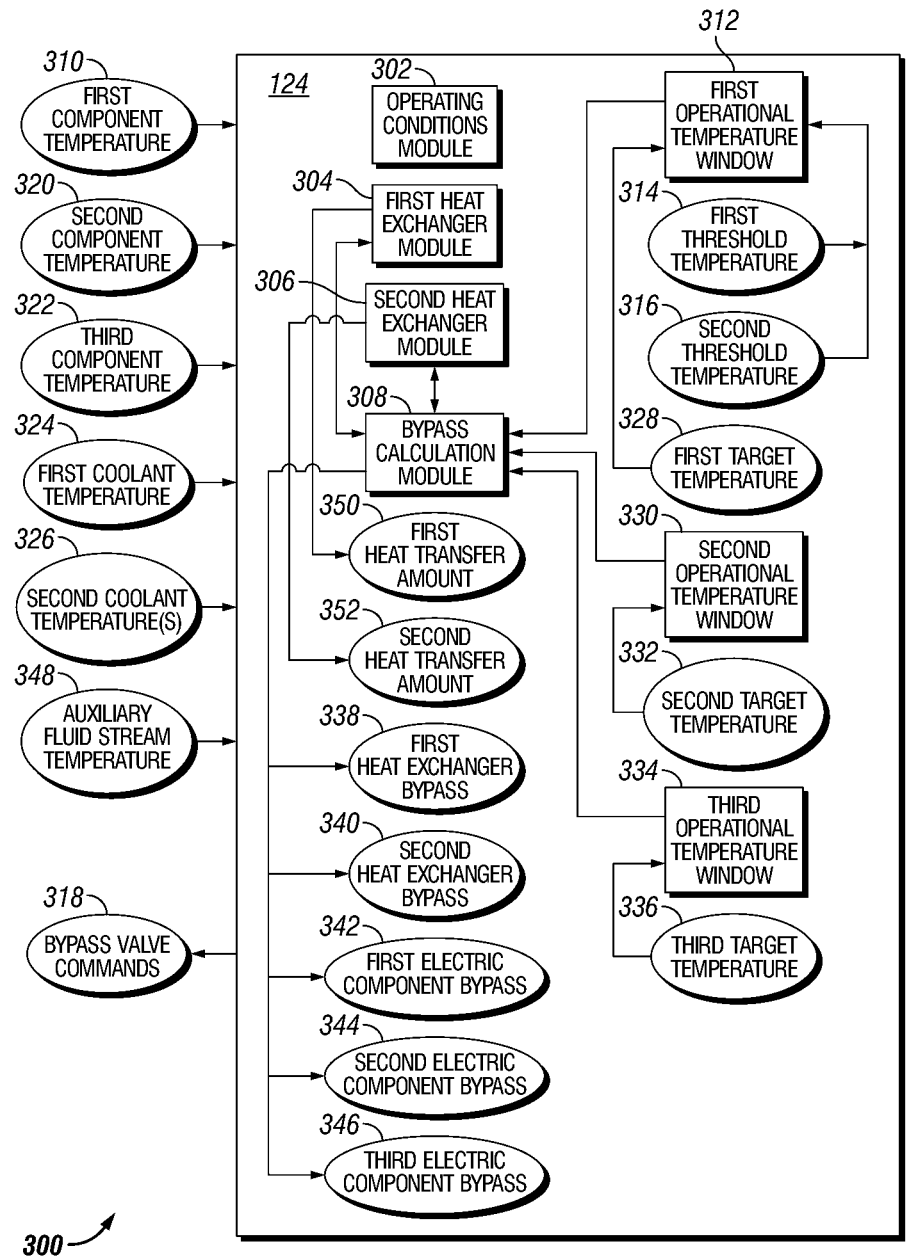
FIG. 3 is a schematic diagram of a processing subsystem for integrated hybrid power system thermal management of components.

FIG. 3 is a schematic diagram of a processing subsystem 300 for integrated hybrid power system thermal management of components. The processing subsystem 300 includes a controller 124. The controller 124 may be a computer or a portion of a computer, and/or may be a distributed device having portions in one or more computers and/or portions embodied in hardware. The controller 124 includes modules structured to functionally execute operations for thermal management of a hybrid power system.

The description herein includes the use of modules to highlight the functional independence of the features of the elements described. A module may be implemented as operations by software, hardware, or at least partially performed by a user or operator. In certain embodiments, modules represent software elements as a computer program encoded on a computer readable medium, wherein a computer performs the described operations when executing the computer program. A module may be a single device, distributed across devices, and/or a module may be grouped in whole or part with other modules or devices. Interpreting a data value includes, without limitation, reading the value from a memory location, receiving the value over a datalink, receiving the value as a physical value (e.g. a voltage reading from a sensor), determining the value from a lookup table, and/or calculating the value from one or more other parameters.

The controller 124 includes an operating conditions module 302 that interprets a first component temperature 310 (e.g. a current electric component operating temperature) and a first threshold temperature 314 (e.g. a threshold operating temperature for the electric component). The controller 124 includes a bypass calculation module 308 that provides a bypass valve command 318 to control a first bypass valve in response to the first component temperature 310 and the first threshold temperature 314. The first bypass valve in the example selectively bypasses a portion of a second coolant flow around a first heat exchanger. An exemplary operation includes the bypass calculation module 308 determining to reduce a first heat exchanger bypass 338 value in response to the first component temperature 310 being lower than the first threshold temperature 314, for example to warm up the first electric component when the operating temperature of the component is too low. The exemplary bypass calculation module 308 provides the bypass valve command 318 in response to the first heat exchanger bypass 338. The final bypass valve command 318 may be subject to hardware constraints, transient operation limitations, or other processing understood in the art such that the final bypass valve command 318 is provided in response to the second heat exchanger bypass 338 but is not identical to the first heat exchanger bypass 338.

The exemplary controller 124 further includes the operating conditions module 302 interpreting a second threshold temperature 316, and the bypass calculation module 308 providing the bypass valve commands 318 to control a second bypass valve in response to the first component temperature 310 and the second threshold temperature 316. For example, the bypass calculation module 308 determines a second heat exchanger bypass 340 value, and provides the bypass valve commands 318 in response to the second heat exchanger bypass 340 value. In a further example, the second bypass valve selectively bypasses a portion of a second heat exchanger, and the controller 124 reduces a bypassed amount for the second heat exchanger in response to the first component temperature 310 being too warm, or higher than the second threshold temperature 316.

In a further embodiment, the controller 124 includes the bypass calculation module 308 providing the bypass valve commands 318 to control the first bypass valve and the second bypass valve to maintain the first component temperature 310 between the first threshold temperature 314 and the second threshold temperature 316. An exemplary embodiment includes the bypass calculation module 308 providing the bypass valve commands 318 to control the first bypass valve and the second bypass valve to maintain the first component temperature 310 at a first target temperature 328. An exemplary embodiment includes the bypass calculation module 308 providing the bypass valve commands 318 to control the first bypass valve and the second bypass valve to maintain the first component temperature 310 within a first operational temperature window 312. In certain embodiments, the operating conditions module 302 interprets the third component temperature 322, and the bypass calculation module 308 determines a third electric component bypass 346 in response to the third component temperature 322, and further in response to the third operational temperature window 334 and/or the third target temperature 336.

The first operational temperature window 312 includes a high and low operation temperature for the first electric component 108. The values for the window 312 may be fixed, predetermined, or updated during run-time for the controller 124. The first target temperature 328 may be a desired value within the first operational temperature window 312, and in certain embodiments or under certain operating conditions, the first operational temperature window 312 may collapse to or be the same as the first target temperature 328. The second operational temperature window 330 and second target temperature 332 correspond to the second electric component 202. The third operational temperature window 334 and the third target temperature 336 correspond to the third electric component 204. Each electric component 108, 202, 204 may have an individual temperature window and/or target, or certain components having similar temperature requirements may share temperature windows and/or targets.

The controller 124 includes an operating conditions module 302 that interprets a first component temperature 310 that is a current temperature for a first electric component. The operating conditions module 302 further interprets a first threshold temperature 314 and a second threshold temperature 316. The controller 124 includes a bypass calculation module 308 that provides a bypass valve command 318 to control a bypass valve for a second heat exchanger in response to the current electric component operating temperature and the second threshold operating temperature. The bypass calculation module 308 determines a second heat exchanger bypass 340, and provides the bypass valve command 318 in response to the second heat exchanger bypass 340. An exemplary control for the bypass valve for the second heat exchanger includes increasing a bypass amount in response to the first component temperature 310 being lower than the first threshold temperature 314, and decreasing the bypass amount in response to the first component temperature 310 being higher than the second threshold temperature 316.

Another exemplary controller 124 interprets a current temperature of a hybrid battery pack (e.g. the first component temperature 310) and a current temperature of the additional electric component (e.g. the second component temperature 320). The controller 124 includes the bypass calculation module 308 that controls a first bypass valve that selectively bypasses a first heat exchanger, a second bypass valve that selectively bypasses a second heat exchanger, and one or two component bypass valve(s) in response to the first component temperature 310 and the second component temperature 320.

Each component bypass valve bypasses one of the hybrid battery pack and the additional electric component. The exemplary controller 124 includes the bypass calculation module 308 that determines a first heat exchanger bypass 338, a second heat exchanger bypass 340, a first electric component bypass 342, and a second electric component bypass 344, and provides the bypass valve commands 318 in response to the bypass parameters 338, 340, 342, 344. The bypass calculation module 308 provides the bypass valve commands 318 to maintain the first component temperature 310 (i.e. the hybrid battery pack temperature in the example) within a first operational temperature window 312 (i.e. the battery pack temperature operational window in the example). Additionally or alternatively, the bypass calculation module 308 provides the bypass valve commands 318 to maintain the second component temperature 320 (i.e. the additional electric component temperature) within a second operational temperature window 330 (i.e. the additional electric component temperature operational window in the example).

The exemplary controller 124 further includes a first heat exchanger module 304 that determines a first heat transfer amount 350 within the first heat exchanger according to a first coolant temperature 324 and a second coolant temperature 326. The first heat transfer amount 350 is an amount of heat transfer that occurs in the first heat exchanger at the current temperatures of the first coolant and the second coolant. The first heat transfer amount 350 may be a specific amount of heat, and/or a function of the flow rate of the first coolant and/or second coolant through the first heat exchanger. In certain embodiments, the bypass calculation module 308 determines the first heat exchanger bypass 338 in response to the first heat transfer amount 350. In one example, the first heat transfer amount 350 is an amount of heat transfer in the first heat exchanger as a function of the flow rate of the second coolant through the heat exchanger, and the first bypass valve selectively bypasses a portion of the second coolant around the first heat exchanger.

The exemplary controller 124 further includes a second heat exchanger module 306 that determines a second heat transfer amount 352 within the second heat exchanger according to the second coolant temperature 326 and an auxiliary fluid stream temperature 348. The second heat transfer amount 352 is an amount of heat transfer that occurs in the second heat exchanger at the current temperatures of the second coolant and the auxiliary fluid stream. The second heat transfer amount 352 may be a specific amount of heat, and/or a function of the flow rate of the second coolant and/or the auxiliary fluid stream through the second heat exchanger. In certain embodiments, the bypass calculation module 308 determines the second heat exchanger bypass 340 in response to the second heat transfer amount 352. In one example, the second heat transfer amount 352 is an amount of heat transfer in the second heat exchanger as a function of the flow rate of the second coolant through the heat exchanger, and the second bypass valve selectively bypasses a portion of the second coolant around the second heat exchanger.

The descriptions which follow provide illustrative embodiments of procedures for performing operations for integrated hybrid power system thermal management. Operations illustrated are understood to be exemplary only, and operations may be combined or divided, and added or removed, as well as re-ordered in whole or part, unless stated explicitly to the contrary herein.

An exemplary procedure includes an operation to interpret a temperature of a hybrid battery pack, and an operation to circulate a second coolant that is thermally coupled to the hybrid battery pack. In response to the temperature of the hybrid battery pack being below a first threshold operating temperature, the procedure includes an operation to increase a heat transfer rate of a first heat exchanger, where the first heat exchanger transfers thermal energy between an engine coolant and the second coolant. The operation to increase the heat transfer rate of the first heat exchanger includes increasing a flow rate of the second coolant through the first heat exchanger, increasing a flow rate of the engine coolant through the first heat exchanger, and/or decreasing a temperature of the engine coolant. The operation to increase the flow rate of the second coolant through the first heat exchanger includes decreasing a bypass portion of the second coolant, and/or increasing a bulk flow rate of the second coolant. The operation to increase the flow rate of the engine coolant through the first heat exchanger includes decreasing a bypass portion of the engine coolant, and/or increasing a bulk flow rate of the engine coolant.

The exemplary procedure further includes, in response to the temperature of the hybrid battery pack being above a second threshold operating temperature, an operation to increase a heat transfer rate of a second heat exchanger, where the second heat exchanger transfers thermal energy between an auxiliary fluid stream and the second coolant. The operation to increase the heat transfer rate of the second heat exchanger includes increasing a flow rate of the second coolant through the second heat exchanger, increasing a flow rate of the auxiliary fluid stream through the second heat exchanger, and/or reducing a temperature of the auxiliary fluid stream. The operation to increase the flow rate of the second coolant through the second heat exchanger includes decreasing a bypass portion of the second coolant and/or increasing a bulk flow rate of the second coolant. The operation to increase the flow rate of the auxiliary fluid stream includes decreasing a bypass portion of the auxiliary fluid stream and/or increasing a bulk flow rate of the auxiliary fluid stream.

In certain embodiments, the procedure further includes an operation to interpret a temperature of an additional electric component, where the operation to increase the heat transfer rate of the first heat exchanger is further in response to the temperature of the additional electric component being below a third threshold temperature. Additionally or alternatively, the operation to increase the heat transfer rate of the second heat exchanger is further in response to the temperature of the additional electric component being above a fourth threshold temperature.

The exemplary procedure further includes an operation to bypass at least a portion of the second coolant around the hybrid battery pack or the additional electric component in response to a temperature of the second coolant, the current temperature of the hybrid battery pack, and the current temperature of the additional electric component. Exemplary operations include reducing a bypassed portion of the second coolant around an electric component to increase a temperature of the component, increasing a bypassed portion of the second coolant around an electric component to decrease a temperature of the component, increasing a bypassed portion of the second coolant in response to a low temperature of the second coolant, and/or decreasing a bypassed portion of the second coolant in response to a high temperature of the second coolant.

Another exemplary procedure further includes an operation to interpret a target temperature of the second coolant in response to the temperature of the hybrid battery pack and the temperature of the additional electric component, where the operation to increase the heat transfer rate of the first heat exchanger and the operation to increase the heat transfer rate of the second heat exchanger is further in response to the target temperature of the second coolant. An exemplary operation to increase the heat transfer rate of the first heat exchanger in response to the target temperature of the second coolant includes determining the temperature of the second coolant is too low, and increasing a heat transfer rate in the first heat exchanger where the temperature of the engine coolant is higher than the temperature of the second coolant. Another exemplary operation to increase the heat transfer rate of the first heat exchanger in response to the target temperature of the second coolant includes determining the temperature of the second coolant is too high, and increasing a heat transfer rate in the first heat exchanger where the temperature of the engine coolant is lower than the temperature of the second coolant. Another exemplary operation to increase the heat transfer rate of the second heat exchanger in response to the target temperature of the second coolant includes determining the temperature of the second coolant is too high, and increasing a heat transfer rate of the second heat exchanger in response to the temperature of the auxiliary fluid stream being lower than the temperature of the second coolant.

An exemplary system includes an internal combustion engine and a first coolant thermally coupled to the internal combustion engine and circulated by a first pump. The system further includes a hybrid battery pack and a second coolant thermally coupled to the hybrid battery pack and circulated by a second pump. The system further includes a first heat exchanger that transfers thermal energy between the first coolant and the second coolant. The system includes an auxiliary fluid stream having a temperature below a target operating temperature for the hybrid battery pack, and a second heat exchanger that transfers thermal energy between the second coolant and the auxiliary fluid stream.

The system includes a means for controlling a temperature of the hybrid battery pack within a battery pack operational temperature window. Exemplary, non-limiting examples of the means for controlling the temperature of the hybrid battery pack are described.

An exemplary means includes a bypass valve that bypasses a selected portion of the first coolant around the first heat exchanger. An increasing portion of the first coolant is bypassed when a reduced heat transfer amount in the first heat exchanger is desired, and a decreasing portion of the first coolant is bypassed when an increased heat transfer amount in the first heat exchanger is desired.

Another exemplary means includes a bypass valve that bypasses a selected portion of the second coolant around the first heat exchanger. An increasing portion of the second coolant is bypassed when a reduced heat transfer amount in the first heat exchanger is desired, and a decreasing portion of the second coolant is bypassed when an increased heat transfer amount in the first heat exchanger is desired.

Another exemplary means includes a controller that commands a bypass valve to increases a heat transfer amount in the first heat exchanger to warm up the hybrid battery pack when the first coolant is at a higher temperature than the second coolant, and a temperature of the hybrid battery pack is below the battery pack operational temperature window and/or below a target temperature for the hybrid battery pack.

Another exemplary means includes a controller that commands a bypass valve to increase a heat transfer amount in the first heat exchanger and/or the second heat exchanger to provide additional cooling to the hybrid battery pack when the temperature of the hybrid battery pack is above the battery pack operational temperature window and/or above a target temperature for the hybrid battery pack. The means further includes the controller commanding the bypass valve to increase the heat transfer rate in the first heat exchanger when the temperature of the first coolant is lower than the temperature of the second coolant, and/or the controller commanding the bypass valve to increase the heat transfer rate in the second heat exchanger when the temperature of the auxiliary fluid stream is lower than the temperature of the second coolant.

A further embodiment of the system includes an additional electric component, where the second coolant is thermally coupled to the additional electric component. The system further includes a means for controlling a temperature of the additional electric component within an additional electric component operational temperature window. Exemplary, non-limiting examples of the means for controlling the temperature of the additional electric component are described.

An exemplary means includes the additional electric component being a first device downstream of the second heat exchanger, and a controller commanding a bypass valve to increase the heat transfer rate in the second heat exchanger in response to a temperature of the additional electric component being above the additional electric component operational temperature window and/or greater than a target temperature for the additional electric component, and further in response to a temperature of the auxiliary fluid stream being lower than a temperature of the second coolant.

Another exemplary means includes a controller commanding one or more bypass valves to increase the heat transfer rate in the first heat exchanger and/or the second heat exchanger in response to a temperature of the additional electric component being above the additional electric component operational temperature window and/or greater than a target temperature for the additional electric component. The controller commands the bypass valve(s) to increase the heat transfer rate(s) further in response to a temperature of the auxiliary fluid stream and/or a temperature of the first coolant being lower than a temperature of the second coolant.

Another exemplary means includes a controller commanding a bypass valve to increase a bypass flow of the second coolant around the hybrid battery pack in response to a temperature of the additional electric component being above the additional electric component operational temperature window and/or greater than a target temperature for the additional electric component. Another exemplary means includes a controller commanding a bypass valve to decrease a bypass flow of the second coolant around the additional electric component in response to a temperature of the additional electric component being above the additional electric component operational temperature window and/or greater than a target temperature for the additional electric component.

A further embodiment of the system includes a means for controlling the temperature of the hybrid battery pack to a target battery pack temperature within the battery pack operational temperature window, and a means for controlling the temperature of the additional electric component to a target additional electric component temperature within the additional electric component operational temperature window. Exemplary, non-limiting examples of the means for controlling the temperature of the hybrid battery pack and the means for controlling the temperature of the additional electric component are described.

An exemplary means includes one of the additional electric component and the hybrid battery pack being a first device downstream of the second heat exchanger, and a controller commanding a bypass valve to increase the heat transfer rate in the second heat exchanger in response to a temperature of the additional electric component being above the target temperature for the additional electric component and/or the hybrid battery pack. The controller further commands the bypass valve to increase the heat transfer rate in response to a temperature of the auxiliary fluid stream being lower than a temperature of the second coolant.

Another exemplary means includes a controller commanding one or more bypass valves to increase the heat transfer rate in the first heat exchanger and/or the second heat exchanger in response to a temperature of the additional electric component being greater than the target temperature for the additional electric component, and/or in response to a temperature of the hybrid battery pack being greater than the target temperature of the hybrid battery pack. The controller commands the bypass valve(s) to increase the heat transfer rate(s) further in response to a temperature of the auxiliary fluid stream and/or a temperature of the first coolant being lower than a temperature of the second coolant.

Another exemplary means includes a controller commanding a bypass valve to increase a bypass flow of the second coolant around the hybrid battery pack in response to a temperature of the additional electric component being greater than a target temperature for the hybrid battery pack. Another exemplary means includes the controller commanding a bypass valve ton increase a bypass flow of the second coolant around the additional electric component in response to a temperature of the hybrid battery pack being greater than a target temperature for the hybrid battery pack.

Another exemplary means includes a controller commanding a bypass valve to decrease a bypass flow of the second coolant around the additional electric component in response to a temperature of the additional electric component being above the additional electric component operational temperature window and/or greater than a target temperature for the additional electric component. Another exemplary means includes the controller commanding a bypass valve to decrease a bypass flow of the second coolant around the hybrid battery pack in response to a temperature of the hybrid battery pack being above a target temperature for the hybrid battery pack.

Another exemplary means includes a bypass valve that bypasses a selected portion of the first coolant around the first heat exchanger. An increasing portion of the first coolant is bypassed when a reduced heat transfer amount in the first heat exchanger is desired, and a decreasing portion of the first coolant is bypassed when an increased heat transfer amount in the first heat exchanger is desired.

Another exemplary means includes a bypass valve that bypasses a selected portion of the second coolant around the first heat exchanger. An increasing portion of the second coolant is bypassed when a reduced heat transfer amount in the first heat exchanger is desired, and a decreasing portion of the second coolant is bypassed when an increased heat transfer amount in the first heat exchanger is desired.

Another exemplary means includes a controller that commands a bypass valve to increases a heat transfer amount in the first heat exchanger to warm the hybrid battery pack and/or the additional electric component when the first coolant is at a higher temperature than the second coolant, and when a temperature of the hybrid battery pack and/or the additional electric component is below the target temperature for the hybrid battery pack and/or the additional electric component.

Another exemplary means includes a controller that commands a bypass valve to increase a heat transfer amount in the first heat exchanger and/or the second heat exchanger to provide additional cooling to the hybrid battery pack and/or the additional electric component when the temperature of the hybrid battery pack and/or the additional electric component is above the target temperature for the hybrid battery pack and/or the additional electric component. The means further includes the controller commanding the bypass valve to increase the heat transfer rate in the first heat exchanger when the temperature of the first coolant is lower than the temperature of the second coolant, and/or the controller commanding the bypass valve to increase the heat transfer rate in the second heat exchanger when the temperature of the auxiliary fluid stream is lower than the temperature of the second coolant.

As is evident from the figures and text presented above, a variety of embodiments according to the present invention are contemplated.

An exemplary system includes an internal combustion engine and a first coolant thermally coupled to the internal combustion engine and circulated by a first pump. The system includes an electric component and a second coolant thermally coupled to the electric component and circulated by a second pump. The system further includes a first heat exchanger that transfers thermal energy between the first coolant and the second coolant. The exemplary system further includes an auxiliary fluid stream having a temperature below a target operating temperature for the electric component, and a second heat exchanger that transfers thermal energy between the second coolant and the auxiliary fluid stream. An exemplary system includes the electric component as a battery pack of a hybrid power system.

In certain embodiments, the system includes a first bypass valve that bypasses a selectable portion of the first coolant or the second coolant around the first heat exchanger. The exemplary system further includes a controller that interprets a current electric component operating temperature and a first threshold operating temperature, and controls the first bypass valve in response to the current electric component operating temperature and the first threshold operating temperature. Certain embodiments include a second bypass valve that bypasses a selectable portion of one of the second coolant and the auxiliary fluid stream around the second heat exchanger. The exemplary controller further interprets a second threshold operating temperature, and controls the second bypass valve in response to the current electric component operating temperature and the second threshold operating temperature. In a further embodiment, the controller further controls the first bypass valve and the second bypass valve to maintain the current electric component operating temperature between the first threshold operating temperature and the second threshold operating temperature.

An exemplary system further includes a second bypass valve that bypasses a selectable portion of the second coolant or the auxiliary fluid stream around the second heat exchanger. A further exemplary system includes a controller that interprets a current electric component operating temperature and a second threshold operating temperature, and controls the second bypass valve in response to the current electric component operating temperature and the second threshold operating temperature.

Certain exemplary systems includes the auxiliary fluid stream as an evaporator gas stream, a condenser liquid stream, or an ambient air stream. An exemplary system includes a second electric component, and an electric component bypass valve that bypasses a selectable portion of the second coolant around the first electric component or the second electric component. Another exemplary system includes an additional electric component, where the second coolant is thermally coupled to the additional electric component.

Yet another exemplary system includes a first bypass valve that bypasses a selectable portion of the second coolant or the first coolant around the first heat exchanger, and a second bypass valve that bypasses a selectable portion of the second coolant or the auxiliary fluid stream around the second heat exchanger. The exemplary system further includes one or more component bypass valves, wherein each component bypass valve bypasses a selectable portion of second coolant around the electric component and/or the additional electric component.

Another exemplary embodiment is a system including an internal combustion engine and a first coolant thermally coupled to the internal combustion engine and circulated by a first pump. The system includes a hybrid battery pack and a second coolant. The second coolant is thermally coupled to the hybrid battery pack and is circulated by a second pump. The system further includes an additional electric component, where the second coolant is thermally coupled to the additional electric component. The system further includes a first heat exchanger that transfers thermal energy between the first coolant and the second coolant, and an auxiliary fluid stream having a temperature below a target operating temperature for the hybrid battery pack. The system includes a second heat exchanger that transfers thermal energy between the second coolant and the auxiliary fluid stream, a first bypass valve that bypasses a selectable portion of the second coolant or the first coolant around the first heat exchanger, and a second bypass valve that bypasses a selectable portion of the second coolant or the auxiliary fluid stream around the second heat exchanger. The system further includes one or more component bypass valves, where each component bypass valve bypasses a selectable portion of the second coolant around the hybrid battery pack or the additional electric component.

A further exemplary system includes a controller that interprets a current temperature of the hybrid battery pack and a current temperature of the additional electric component. The controller further controls the first bypass valve, the second bypass valve, and the component bypass valve(s) in response to the current temperature of the hybrid battery pack and the current temperature of the additional electric component. The exemplary system further includes the controller controlling the first bypass valve, the second bypass valve, and the component bypass valve(s) to maintain the current temperature of the hybrid battery pack within a battery pack temperature operational window, and to maintain the current temperature of the additional electric component within an additional electric component temperature operational window.

In certain embodiments, the additional electric component is an electric motor, an electric generator, an electric motor-generator, and/or a power electronics component.

An exemplary embodiment includes the second coolant flowing through, in order, the first heat exchanger, the additional electric component, and the hybrid battery pack, where the target operating temperature for the hybrid battery pack is lower than a second target operating temperature for the additional electric component. A further embodiment includes the second heat exchanger positioned between the additional electric component and the hybrid battery pack. A still further embodiment includes a third electric component, where the second coolant is thermally coupled to the third electric component, and where the third electric component is positioned between the second heat exchanger and the hybrid battery pack. A further embodiment includes a third target operating temperature for the third electric component, where the third target operating temperature is lower than the second target operating temperature. In a still further embodiment, the target operating temperature for the hybrid battery pack is lower than the third target operating temperature.

Yet another exemplary embodiment is a method including interpreting a temperature of a hybrid battery pack, circulating a second coolant that is thermally coupled to the hybrid battery pack, and in response to the temperature of the hybrid battery pack being below a first threshold operating temperature, increasing a heat transfer rate of a first heat exchanger, the first heat exchanger structured to transfer thermal energy between an engine coolant and the second coolant. The method further includes, in response to the temperature of the hybrid battery pack being above a second threshold operating temperature, increasing a heat transfer rate of a second heat exchanger, the second heat exchanger structured to transfer thermal energy between an auxiliary fluid stream and the second coolant. In certain embodiments, the method includes interpreting a temperature of an additional electric component, where the increasing the heat transfer rate of the first heat exchanger is further in response to the temperature of the additional electric component being below a third threshold temperature, and where the increasing the heat transfer rate of the second heat exchanger is further in response to the temperature of the additional electric component being above a fourth threshold temperature.

An exemplary method further includes bypassing at least a portion of the second coolant around the hybrid battery pack or the additional electric component in response to a temperature of the second coolant, the current temperature of the hybrid battery pack, and the current temperature of the additional electric component. Another exemplary method further includes interpreting a target temperature of the second coolant in response to the temperature of the hybrid battery pack and the temperature of the additional electric component, where increasing the heat transfer rate of the first heat exchanger and the increasing the heat transfer rate of the second heat exchanger is further in response to the target temperature of the second coolant.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
    an internal combustion engine and a first coolant thermally coupled to the internal combustion engine and circulated by a first pump;
    an electric component and a second coolant thermally coupled to the electric component and circulated by a second pump;
    a first heat exchanger structured to transfer thermal energy between the first coolant and the second coolant;
    an auxiliary fluid stream having a temperature below a target operating temperature for the electric component;
    a second heat exchanger structured to transfer thermal energy between the second coolant and the auxiliary fluid stream;
    wherein the electrical component is positioned downstream of the first heat exchanger and upstream of the second heat exchanger; and
    wherein the second heat exchanger is positioned upstream of the first heat exchanger.

2. The system of claim 1, wherein the electric component comprises a battery pack of a hybrid power system.

3. The system of claim 1, further comprising a first bypass valve structured to bypass a selectable portion of one of the second coolant and the first coolant around the first heat exchanger.

4. The system of claim 3, further comprising a controller structured to interpret a current electric component operating temperature and a first threshold operating temperature, and to control the first bypass valve in response to the current electric component operating temperature and the first threshold operating temperature.

5. The system of claim 4, further comprising a second bypass valve structured to bypass a selectable portion of one of the second coolant and the auxiliary fluid stream around the second heat exchanger.

6. The system of claim 5, wherein the controller is further structured to interpret a second threshold operating temperature, and to control the second bypass valve in response to the current electric component operating temperature and the second threshold operating temperature.

7. The system of claim 6, wherein the controller is further structured to control the first bypass valve and the second bypass valve to maintain the current electric component operating temperature between the first threshold operating temperature and the second threshold operating temperature.

8. The system of claim 1, further comprising a second bypass valve structured to bypass a selectable portion of one of the second coolant and the auxiliary fluid stream around the second heat exchanger.

9. The system of claim 8, further comprising a controller structured to interpret a current electric component operating temperature and a second threshold operating temperature, and to control the second bypass valve in response to the current electric component operating temperature and the second threshold operating temperature.

10. The system of claim 1, wherein the auxiliary fluid stream comprises a fluid selected from the fluids consisting of: an evaporator gas and a condenser liquid.

11. The system of claim 1, wherein the auxiliary fluid stream comprises an ambient air stream.

12. The system of claim 1, further comprising a second electric component and an electric component bypass valve structured to bypass a selectable portion of the second coolant around one of the first electric component and the second electric component wherein the second electronic component is positioned downstream of the first heat exchange and upstream of the second heat exchange.

13. The system of claim 1, further comprising:
at least one additional electric component, the second coolant thermally coupled to the at least one additional electric component;
a first bypass valve structured to bypass a selectable portion of one of the second coolant and the first coolant around the first heat exchanger;
a second bypass valve structured to bypass a selectable portion of one of the second coolant and the auxiliary fluid stream around the second heat exchanger; and
at least one component bypass valve structured to bypass a selectable portion of the second coolant around one of the electric component and the at least one additional electric component.

14. A system, comprising:
an internal combustion engine and a first coolant thermally coupled to the internal combustion engine and circulated by a first pump;
a hybrid battery pack and a second coolant thermally coupled to the hybrid battery pack and circulated by a second pump;
an additional electric component, the second coolant thermally coupled to the additional electric component;
a first heat exchanger structured to transfer thermal energy between the first coolant and the second coolant;
an auxiliary fluid stream having a temperature below a target operating temperature for the hybrid battery pack;
a second heat exchanger structured to transfer thermal energy between the second coolant and the auxiliary fluid stream;
a first bypass valve structured to bypass a selectable portion of one of the second coolant and the first coolant around the first heat exchanger;
a second bypass valve structured to bypass a selectable portion of one of the second coolant and the auxiliary fluid stream around the second heat exchanger;
at least one component bypass valve structured to bypass a selectable portion of the second coolant around one of the hybrid battery pack and the additional electric component;
wherein the additional electric component is positioned downstream of the first heat exchanger and upstream of the second heat exchanger; and
wherein the hybrid battery pack is positioned downstream of the second heat exchanger and upstream of the first heat exchanger.

15. The system of claim 14, further comprising a controller structured to:
interpret a current temperature of the hybrid battery pack and a current temperature of the additional electric component; and
control the first bypass valve, the second bypass valve, and the at least one component bypass valve in response to the current temperature of the hybrid battery pack and the current temperature of the additional electric component.

16. The system of claim 15, further comprising the controller structured to control the first bypass valve, the second bypass valve, and the at least one component bypass valve to maintain the current temperature of the hybrid battery pack within a battery pack temperature operational window, and to maintain the current temperature of the additional electric component within an additional electric component temperature operational window.

17. The system of claim 14, wherein the additional electric component comprises an electric component selected from the electric components consisting of: an electric motor, an electric generator, an electric motor-generator, and a power electronics component.

18. The system of claim 14, wherein the second coolant flows through, in order, the first heat exchanger, the additional electric component, and the hybrid battery pack, and wherein the target operating temperature for the hybrid battery pack is lower than a second target operating temperature for the additional electric component.

19. The system of claim 18, further comprising a third electric component, the second coolant thermally coupled to the third electric component, wherein the third electric component is positioned between the second heat exchanger and the hybrid battery pack.

20. The system of claim 19, wherein a third target operating temperature for the third electric component is lower than the second target operating temperature.

21. The system of claim 20, wherein the target operating temperature for the hybrid battery pack is lower than the third target operating temperature.

22. A method, comprising:
interpreting a temperature of a hybrid battery pack;
circulating a second coolant thermally coupled to the hybrid battery pack;
interpreting a temperature of an additional electric component;
in response to the temperature of the hybrid battery pack being below a first threshold operating temperature, increasing a heat transfer rate of a first heat exchanger, the first heat exchanger structured to transfer thermal energy between an engine coolant and the second coolant;

in response to the temperature of the hybrid battery pack being above a second threshold operating temperature, increasing a heat transfer rate of a second heat exchanger, the second heat exchanger structured to transfer thermal energy between an auxiliary fluid stream and the second coolant;

in response to the temperature of the additional electric component being below a third threshold temperature, increasing the heat transfer rate of the first heat exchanger; and in response to the temperature of the additional electric component being above a fourth threshold temperature, increasing the heat transfer rate of the second heat exchanger.

23. The method of claim 22, further comprising bypassing at least a portion of the second coolant around one of the hybrid battery pack and the additional electric component in response to a temperature of the second coolant, the current temperature of the hybrid battery pack, and the current temperature of the additional electric component.

24. The method of claim 22, further comprising interpreting a target temperature of the second coolant in response to the temperature of the hybrid battery pack and the temperature of the additional electric component, wherein the increasing the heat transfer rate of the first heat exchanger and the increasing the heat transfer rate of the second heat exchanger is further in response to the target temperature of the second coolant.

25. A system, comprising:
an internal combustion engine and a first coolant thermally coupled to the internal combustion engine and circulated by a first pump;
a hybrid battery pack and a second coolant thermally coupled to the hybrid battery pack and circulated by a second pump;
a first heat exchanger structured to transfer thermal energy between the first coolant and the second coolant;
an auxiliary fluid stream having a temperature below a target operating temperature for the hybrid battery pack;
a second heat exchanger structured to transfer thermal energy between the second coolant and the auxiliary fluid stream;
a means for controlling a temperature of the hybrid battery pack within a battery pack operational temperature window;
wherein the hybrid battery pack is positioned downstream of the first heat exchanger and upstream of the second heat exchanger; and
wherein the first heat exchanger is downstream of the second heat exchanger.

26. The system of claim 25, further comprising an additional electric component, the second coolant thermally coupled to the additional electric component, and a means for controlling a temperature of the additional electric component within an additional electric component operational temperature window;
wherein the additional electric component is positioned downstream of the first heat exchanger and upstream of the second heat exchanger.

27. The system of claim 26, further comprising a means for controlling the temperature of the hybrid battery pack to a target battery pack temperature within the battery pack operational temperature window, and a means for controlling the temperature of the additional electric component to a target additional electric component temperature within the additional electric component operational temperature window.

28. The system of claim 13, wherein the least one additional electric component comprises a second electric component and a third electronic component;
wherein the second electric component is positioned downstream of the first heat exchanger and upstream of the second heat exchanger; and
wherein the third electronic component is positioned downstream of the second heat exchanger and upstream of the electronic component.

* * * * *